US007462952B2

(12) United States Patent
Bailey

(10) Patent No.: US 7,462,952 B2
(45) Date of Patent: Dec. 9, 2008

(54) ELECTRICAL POWER CONTROL SYSTEM

(76) Inventor: David Bailey, 280 Leslie Rd., Tampa, FL (US) 33634

( * ) Notice: Subject to any disclaimer, the term of this patent is extended or adjusted under 35 U.S.C. 154(b) by 0 days.

(21) Appl. No.: 11/585,552

(22) Filed: Oct. 23, 2006

(65) Prior Publication Data

US 2007/0069579 A1 Mar. 29, 2007

Related U.S. Application Data

(63) Continuation of application No. 10/675,378, filed on Sep. 30, 2003, now Pat. No. 7,138,729.

(51) Int. Cl.
*B60L 1/00* (2006.01)
*B60L 3/00* (2006.01)
*H02J 3/00* (2006.01)
*H02J 5/00* (2006.01)
*H02H 7/06* (2006.01)

(52) U.S. Cl. .............................. 307/9.1; 307/45; 361/21

(58) Field of Classification Search .................. 307/9.1, 307/45; 361/21
See application file for complete search history.

(56) References Cited

U.S. PATENT DOCUMENTS

| 2,246,926 | A | * | 6/1941 | Roman | 307/105 |
| 3,652,866 | A | * | 3/1972 | Moakler et al. | 307/80 |
| 6,075,688 | A | * | 6/2000 | Willard et al. | 361/92 |
| 6,366,062 | B2 | * | 4/2002 | Baretich et al. | 323/223 |
| 6,525,587 | B2 | * | 2/2003 | Makino | 327/292 |
| 6,538,345 | B1 | * | 3/2003 | Maller | 307/86 |
| 6,856,103 | B1 | * | 2/2005 | Hudson et al. | 315/308 |
| 6,879,060 | B2 | * | 4/2005 | Hohri | 307/64 |
| 6,980,911 | B2 | * | 12/2005 | Eaton et al. | 702/57 |
| 7,031,124 | B2 | * | 4/2006 | Takahashi | 361/30 |

\* cited by examiner

*Primary Examiner*—Michael J Sherry
*Assistant Examiner*—Hal I Kaplan
(74) *Attorney, Agent, or Firm*—Arthur W. Fisher, III

(57) ABSTRACT

An electrical power control system for use with a recreational vehicle or similar load to selectively control power thereto from either a utility power source or a generator power source comprising a power control stage coupled to the utility power source and the generator power source by a power supply stage to operate the electrical power control system and a utility/generator switch arrangement to selectively direct the power from either the utility power source or the generator power source to the recreational vehicle wherein the power control stage monitors polarity, phase and voltage levels, and controls the utility/generator switch arrangement to selectively feed power from either the utility power source or the generator power source to the recreational vehicle under a predetermined plurality of operating parameters or conditions and fault conditions.

20 Claims, 7 Drawing Sheets

ELECTRICAL POWER CONTROL SYSTEM

CROSS-REFERENCE

Figure 1:
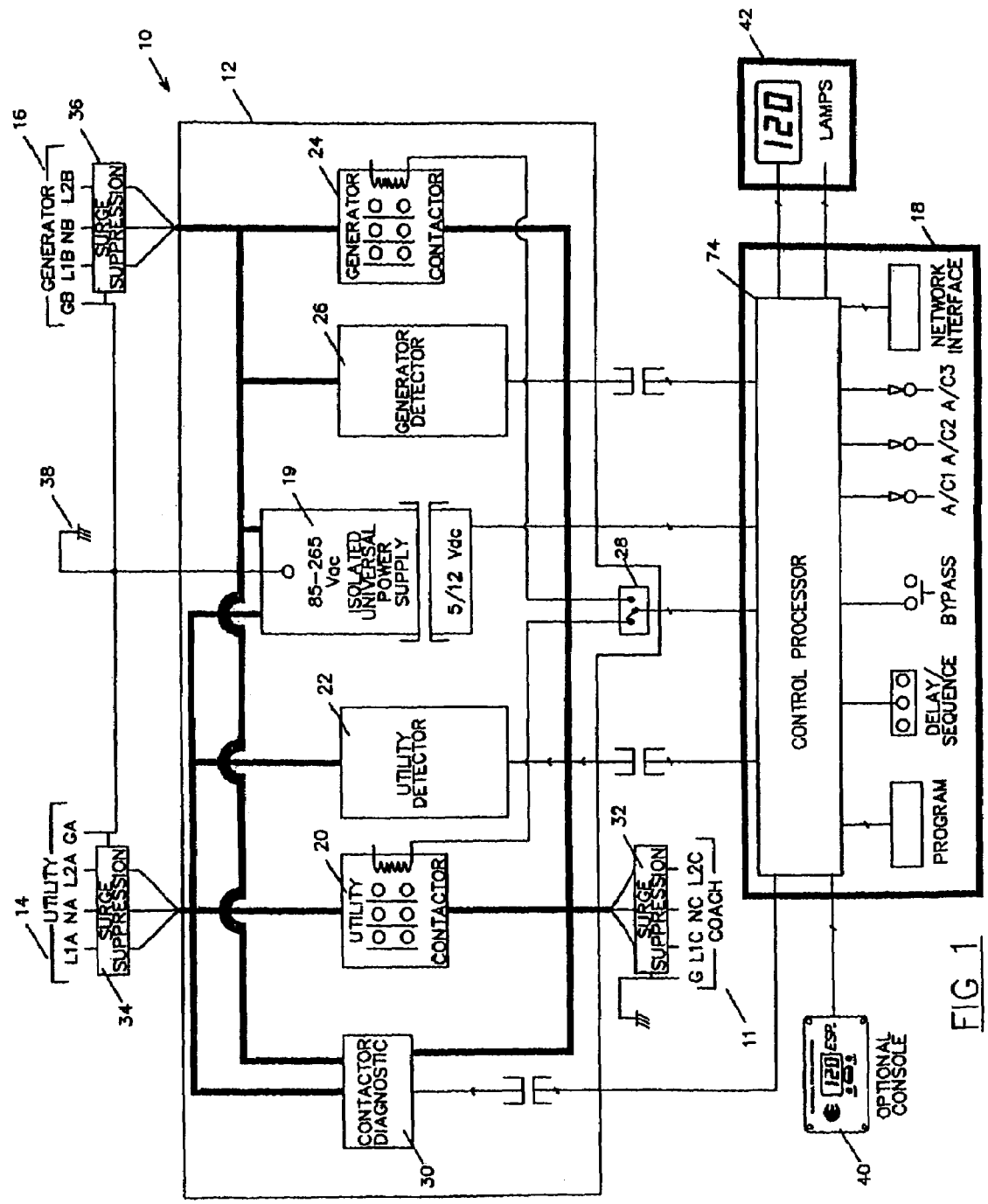

This is a Request For Continued Examination application of application Ser. No. 10/675,378 filed Sep. 30, 2003 now U.S. Pat. No. 7,138,729 for Inventor David Bailey entitled Electrical Power Control System.

BACKGROUND OF THE INVENTION

1. Field of the Invention

An electrical power control system for use with a recreational vehicle to selectively control power thereto from a either utility power source or a generator power source.

2. Description of the Prior Art

Various types of metering equipment are available to measure, control and display the operating conditions and parameters of electrical sources. Unfortunately such equipment does not generally provide unified operation or important electrical functions to operate RVs reliably and easily. For example, the AC coil noise is very annoying, especially if the products are mounted behind the bedroom cabinets or under the bed. Contact jitter caused by marginal voltage often results in damaging contactor failure. Contactor failure can cause a potentially hazardous open neutral condition. Mechanical interlocks are commonly used to prevent malfunctioning contactors from causing multiple contactors from being engaged simultaneously. Add-on surge protectors are commonly used but only connect to the source wiring or a single point of protection.

Existing equipment includes measurement and controlling circuitry directly connected to the source wiring without isolation. This may allow faulty wiring hazards to be connected directly to system controls and monitors.

Load management is generally operated with voltage or load currents but does not account for source phases. Most voltage measurement and monitoring equipment uses rectified average voltage measurements and does not work on modified sine or square wave sources such as solid state generators, inverters and uninterruptible power supplies with desired accuracy.

Examples of the prior art are found in U.S. Pat. No. 4,499,385 and U.S. Pat. No. 4,617,472.

SUMMARY OF THE INVENTION

The present invention relates to an electrical power control system for use with recreational vehicles and similar loads to provide comprehensive electrical power control management to selectively control power from either a utility power source or generator power source and to protect the electrical system and appliances of the load from damage.

The electrical power control system comprises a power control stage to provide multiple methods of power control and system protection. The power control stage also provides faulty wiring protection. For example, in a 240 volt application such as with a recreational vehicle (RV) or marine application, wiring is critical. Initially, when plugging into or disconnecting from the 240 volt source, there is an instant of time when the electrical plug makes connection to line 1 and line 2 while the neutral is open. This can result in damaging voltage applied to the circuits and equipment that can cause failures or even fire. RV and marine manufacturers warn to "turn off" breakers before connecting and disconnecting external power sources. Although important, the damage to this wiring is often forgotten or ignored. The power control stage, when powered up, will analyze the incoming power for a predetermined period of time such as three seconds, insuring all wiring conditions are good and that voltage is within preset operational limits and only then feeds or supplies power to the RV. That is when the incoming power is determined to be acceptable, the power control stage will then apply the power to the load. While the system is operating, the wiring is constantly analyzed. If a wire becomes loose the power control stage will disconnect the power. When the power control stage detects faulty wiring, a utility or generator contactor opens, a wire fault indicator illuminates, and an LED displays the fault source electrical power control system also includes low and high voltage protection preventing damage to appliances from poor service voltage, faulty service wiring, too long service connections, faulty generators, too long extension cords, too small extension cords and similar circuit deficiencies.

The power control stage controls the supply of power from the utility power source or the generator power source when within a predetermined voltage range such as from about 102 volts to about 135 volts. The power control stage performs RMS calculations over time to determine the actual operating voltage. The average of the RMS voltage is displayed on a digital LED. If the voltage is out of the preset operational limit or range, but within a second predetermined range or limit such as from about 85 volts to about 150 volts, the power control stage will allow a temporary by-pass of a voltage fault disconnection. The power control stage will flash the display to indicate operating in a by-pass mode. When power is removed, the by-pass state will automatically turn off. Voltage conditions below about 85 or above about 150 volts will not operate in by-pass mode and the power control stage will disconnect the power to the load. The power control stage employs RMS voltage technology to accurately measure all power source parameters.

Surge protection or transient suppression on the input power source lines and contactor output power lines, protects devices and appliances throughout the RV or load by absorbing surges up to about 5,000 joules with a maximum withstanding surge current of about 50,000 amps.

The electrical power control system is operable in three selectable modes. A delay mode provides a delay of power to be supplied to the RV at initial power on or after power is restored after a fault condition has interrupted the supply of power to the load. A sequence mode employs load management to sequence on heavy loads, such as air conditioners, on and off. Sequencing provides a delay on connection as well as reverse sequencing if the voltage falls below a predetermined value. Sequencing permits hands free management of the devices and appliances in the RV to use all available power without the operator manually turning on and off the devices and appliances. The sequence mode also allows the unit to be powered on in 3 seconds while providing automatic delays for the air conditioners or similar heavy loads. An unrestricted mode provides no delay or load management.

An optional remote digital console can be used to display and operate the electrical power control system from the cab or other remote location. The advantage of using the remote digital console is that a display allows the operator to conveniently observe the operating RMS voltage or any fault condition as well as the ability to enter the by-pass mode of operation from the interior of the coach or other location.

The invention accordingly comprises the features of construction, combination of elements, and arrangement of parts that will be exemplified in the construction hereinafter set forth, and the scope of the invention will be indicated in the claims.

DETAILED DESCRIPTION OF THE PREFERRED EMBODIMENT

The present invention relates to an electrical power control system capable of monitoring wiring conditions, voltage polarity, phase and levels to selectively supply and transfer utility power or generator power to an operating load such as a recreational vehicle, motor coach or similar load. The electrical power control system employs low and high voltage and wiring fault disconnects and surge protection or transient suppression on the input source lines as well as the load lines to protect the operating load. The effective RMS voltage is displayed on a primary control and display and on an optional remote console. LED status indicators allow easy diagnosis of fault conditions that may prevent proper coach operation. A by-pass switch can be used to allow the load to operate when the voltage is out of predetermined normal operating range, but within a predetermined minimum and maximum voltage range. A second by-pass switch can be located on the optional remote console.

The electrical power control system tests for fault conditions and voltage as shown in Table 1.

TABLE 1

| Display | Explanation |
| --- | --- |
| GEN | Generator power on delay (20 seconds) |
| LO_ | Low voltage (less than 102 Vac) |
| HI_ | High voltage (greater than 135 Vac) |
| Gnd | Open Ground |
| Neu | Open Neutral |
| Pol | Reverse Polarity |
| E_H | Extra High Voltage (greater than 150 Vac) |
| "flashing" | By-pass mode |
| FLT | Line 1 or Line 2 open wiring fault |
| — | Processing delay for new readings |
| CFL | Internal communication fault between microprocessors |
| dIA | Internal diagnostic error |

The electrical power control system is selectively operable in one of three operating modes: delay, sequence and unrestricted. In the delay mode, the electrical power control system will delay the closing or coupling circuits or contactors for a predetermined time such as 2.5 minutes to compensate for air conditioners in the load without internal time delays. The sequence mode closes or completes the appropriate contactors or circuits and controls the air conditioners in the load independently providing sequenced delays at start up as well as shedding of A/Cs for low voltage power management. The unrestricted mode operation is without sequencing and delay and is used on loads that have incorporated other means of load control.

In the delay mode, the electrical power control system initially displays a power on status for a predetermined period of time such as three seconds; and if a wiring or voltage fault is detected, the appropriate code is displayed. If there are no fault conditions, the electrical power control system delays power to appropriate contactors or switch arrangement for a predetermined period of time such as 2.5 minutes and a delay enunciator is illuminated. A by-pass switch may be pressed to override or by-pass the delay if the electrical power control system is operating within predetermined ranges. The electrical power control system will power on the generator contactor or switch arrangement if the generator is on and operating within acceptable limits or the utility contactor or switch arrangement if the coach is connected to shore power and the supplied voltage and wiring are within acceptable operating ranges or limits. The generator has priority if both the generator power source and the utility power source are present and within acceptable operating parameters, limits or ranges. If the power source changes and the generator comes on-line, the "GEN" will be displayed for a predetermined time such as 20 seconds then transfer the source of power to the generator. If the shore (utility) power source is connected while the generator is operational, the electrical power control system will continue to operate with power from the generator. Wire diagnostics are only enabled on the active source of power. An LED displays the average voltage of the two power lines if both are supplied or single line if only one is available. If a wiring or voltage fault condition occurs, the contactor switch arrangement will power off and the specific cause for the fault will be displayed. The voltage level fault conditions are qualified for a predetermined period of time such as eight seconds to prevent temporary line fluctuations from tripping a fault condition. If the voltage is out of normal range and the operator wants to power-up the coach, the operator can shut-off all inductive loads including air conditioners and the like and press the by-pass switch to engage the appropriate contactor or switch arrangement. A display will flash the voltage reading while in the by-pass mode. The voltage must be within a predetermined operating range or limit such as greater than about 85 Vac and less than about 150 Vac and without wiring fault conditions such as open ground or open neutral for by-pass operation. If the operator presses the by-pass switch and the display flickers once but the electrical power control system does not enter the by-pass mode of operation, the condition cannot be by-passed.

In the sequence mode, the electrical power control system initially displays a power on status for a predetermined period of time such as three seconds; and if there are no fault conditions and generator power is applied, the electrical power control system will display GEN for a predetermined period of time such as twenty seconds then the generator contactor or switch arrangement will close to supply power to the load. If there are no fault conditions and shore (utility) power is applied, the electrical power control system will power on or close the utility contactor or switch arrangement. The generator has priority if both power sources are active. Optional A/C relays will be sequenced on after a first predetermined period of time such as a 2.5 minute delay on load A/C #1 and after a second predetermined period of time such as 8 additional seconds for load A/C #2 if the supply voltage is sufficient and repeated for additional control load outputs. The A/Cs will be sequenced off if operating voltage falls below a predetermined voltage level such as about 102 Vac for more than a predetermined period of time such as eight seconds. After the load A/Cs have been shed, the electrical power control system requires the source voltage to be greater than a predetermined voltage level such as about 108 Vac to sequence the A/C loads on. If the power source changes and the generator comes on-line, the GEN will be displayed for a predetermined period of time such as twenty seconds then switch over to generator. If the shore (utility) power is connected while the generator is operational then the electrical power control system will continue to operate from the generator as long as the generator is on and within operating limits. Wire diagnostics are only enabled or read on the active source. An LED displays the average voltage of the two power lines if both are supplied or a single line if only one is available. If a wiring or voltage fault condition occurs, the contactors or switch arrangement will be powered off and the specific cause for the fault is displayed. The voltage level faults are qualified for a predetermined period of time such as eight seconds to prevent temporary line fluctuations from tripping a fault condition. If the voltage is out of the predetermined operating range and the operator wants to operate the coach, after the electrical power control system has shed the A/Cs, the operator can press the by-pass switch and the appropriate contactor will engage. A display will flash the voltage reading while in the by-pass mode. The voltage must be within a predetermined operating range or limit such as greater than about 85 Vac and less than about 150 Vac and without wiring fault conditions such as open ground or open neutral for by-pass operations. If the operator presses the by-pass switch and the display flickers once but the electrical power control system does not enter the by-pass mode of operation, the condition cannot be by-passed.

Additional features are available that allow one or two loads to operate. Specifically, if the incoming power source has only one phase, less than all the load appliances will be energized simultaneously, and if the incoming power source has two phases all the load appliances can be energized. The electrical power control system allows load switching that may be alternated at intervals to roll the loads.

In the unrestricted mode, the electrical power control system initially displays a "power on" status for a predetermined period of time such as three seconds. If there are no fault conditions and generator power is applied, the electrical power control system will display GEN for a predetermined period of time such as twenty seconds then close the generator contactor or switch arrangement. If there are not fault conditions and shore power is applied, the electrical power control system will power on the utility contactor. The generator has priority if both power sources are active. The selected power source is shown on the load enunciators and a control signal supplied on load management outputs. If the power source is utility shore power then the A/C #1 output is activated. If the power source is generator power then the A/C #2 output is activated.

The control processor's program may be modified or upgraded by connecting to the programming/expansion ports. The ports serve multiple functions, such as a development emulation port, programming input, or network interface. In addition, there is a detected automotive type network interface that can be programmed with various type of protocols including RV-C and J1939 industry standards. The operation of the electrical power control system with the multiple ports allows programming, emulation and networking to be used simultaneously.

As shown in FIG. 1, the electrical power control system 10 of the present invention is coupled between a recreational vehicle 11 or other load and a utility power source 14 and a generator power source 16 to selectively control the supply or electrical power thereto. The electrical power control system 10 comprises a power supply stage 12 coupled to the utility power source 14 through lines L1A, NA and L2A and to the generator power source 16 through lines L1B, NB and L2B and a power control stage 18 coupled to the power supply stage 12.

The power supply stage 12 comprises an isolated low voltage direct current electrical power control system power supply 19 and an alternating current load power supply including a utility contactor or switching power relay 20 and a generator contactor or switching power relay 24 coupled to the coach 11 through lines L1C, NC, and L2C, and to the power control stage 18 through an interlock selector or switch 28. A utility detector 22 and a generator detector 26 are coupled between the utility power source 14 and the power control stage 18 and between the generator power source 16 and the power control stage 18 respectively. In addition, a contactor or switch diagnostic device or circuit 30 is coupled between the processor power supply 19, utility power source 14, generator power source 16, utility switching power relay 20, generator switching power relay 24, load 11 and the power control stage 18.

Surge suppressors or protectors 32, 34, and 36 are coupled between the power supply stage 12 and the coach 11, the utility power source 14, the power supply stage 12 and earth ground 38 and the generator power source 16, the power supply stage 12 and earth ground 38 respectively. Surge suppressors 32, 34 and 36 (not shown) may comprise fuses and detectors or the like to interface with power control stage 18. The power control stage 18 may further include a system status console with display and a remote indicator display indicated as 40 and 42 respectively.

Figure 2:
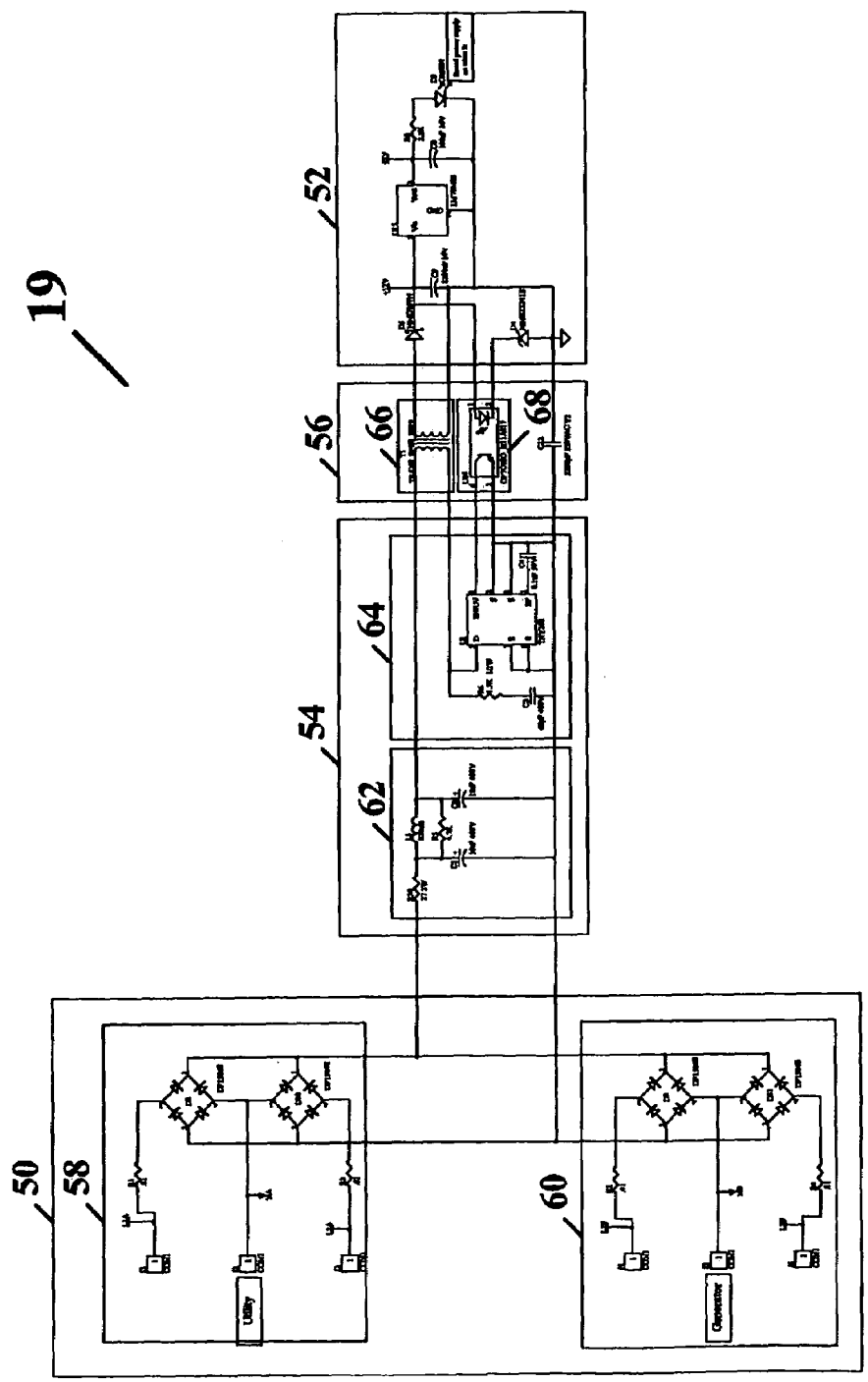

As shown in FIG. 2, the isolated low voltage direct current electrical power control system power supply 19 comprises an input stage 50 and an output stage 52 coupled through a filtered high voltage switching converter stage 54 and an isolation stage 56. The input stage 50 comprises dual utility full wave rectifiers 58 and dual generator full wave rectifiers 60 coupled by lines L1A, NA and L2A, and lines L1B, NB and L2B to the utility power source 14 and the generator power source 16 respectively to selectively supply power therefrom. The dual full wave rectifiers 58 and 60 allow voltage to feed to the input stage 50 from any line to neutral or line to line of either the utility power source 14 or the generator power source 16. The filtered high voltage switching converter stage 54 comprises an input line filter 62 that reduces electro magnetic interference or EMI of the electrical power control system 10 and a switching controller 64 to drive the isolation stage 56 that comprises an isolation transformer 66 to step down the voltage and an isolated feed-back optoisolator 68 to regulate the output stage 52. The output stage 52 rectifies and filters the isolated low voltage power at about +12 Vdc and a regulated digital supply power at about +5 Vdc.

Figure 3:
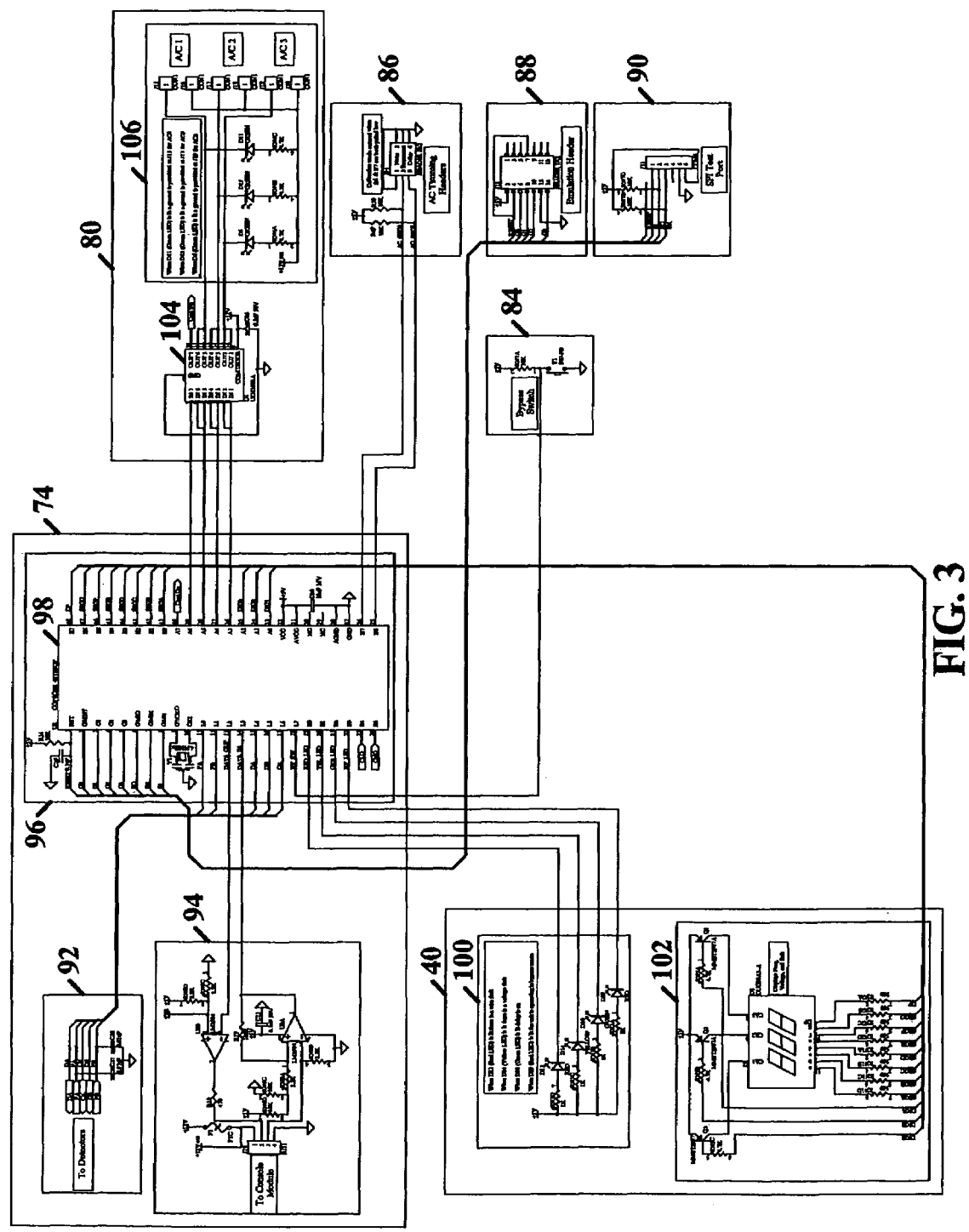

FIG. 3 shows the details of the power control stage 18 with power inputs and outputs. The power control stage 18 comprises a control processor stage 74 coupled to the system status console 40 and a load management stage 80, by-pass control or switch 84, operating mode control or selector 86, emulation header 88 and multi-use serial peripheral interface or SPI header 90. The control processor stage 74 comprises circuitry 96 including a microcontroller 98 with firmware to control the operation of the electrical power control system 10, a detectors interface 92 and a remote console interface 94. The control processor stage 74 performs the centralized controls using the system inputs and comparing these inputs to predetermined bi-level thresholds to prevent cycling along with an internal time base and timers and output to control the switching power relays 20 and 24 and system status indicators 40 and 42. The load management stage 80 comprises a driver interface integrated circuit 104 coupled to connectors and a plurality of LEDs 106 to indicate the status of each output to allow microcontroller 98 to selectively enable any combination of the plurality of loads AC1, AC2 and AC3 within the coach 11. The operating mode control or selector 86 permits an operator or user to select the test/delay/sequence/unrestricted operation mode of the electrical power control system 10. By placing jumpers the operation may be configured for test diagnostics, delay, sequence or unrestricted mode programming. The emulation header 88 provides a port to the microcontroller 98 to download programs and also to perform emulation control. The multi-use SPI header 90 provides a multi-use port to program the microcontroller 98, to provide an expansion interface, to interface to other processor based devices and to network to other devices. The system status console 40 includes enunciators 100 to indicate the status of the electrical power control system 10 to display various operation conditions such as wire faults, voltage faults, delay status and by-pass activation. The system status console 40 includes a segmented digital display 102 to show the source RMS voltage as well as operational conditions such as delay, generator delay and wiring faults.

Figure 4:
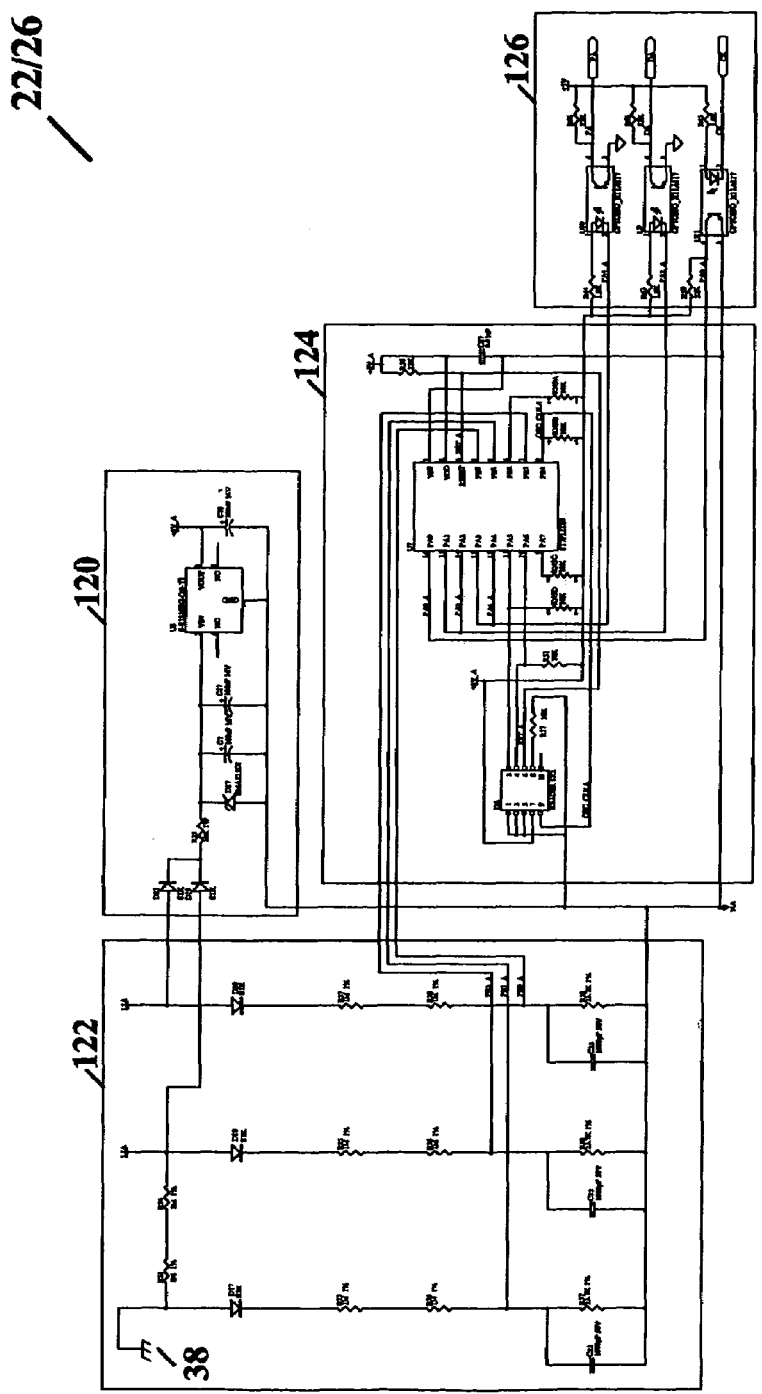

FIG. 4 discloses the details of the utility detector 22 or the generator detector 26 coupled between the utility power source 14 and the power control stage 18 and between the generator power source 16 and the power control stage 18 respectively. The detectors 22 and 26 comprise a power supply stage 120 and a high voltage input signal conditioning stage 122 each coupled to an input utility power source and a microcontroller 124, and an isolated data output stage 126 coupled to the microcontroller 124.

In the preferred embodiment source voltage, frequency, phase and wire diagnostics are monitored. Of course, the source current can also be monitored. The power supply stage 120 rectifies lines L1A and L2A with respect to NA voltage or L1B and L2B with respect to NB, dropping, filtering and regulating to supply constant voltage of about +3V to the microcontroller 124. The high voltage input signal-conditioning stage 122 rectifies lines L1A, L2A and earth ground 38 with respect to NA or L1B and L2B and earth ground 38 with respect to NB and further scales and filters the input voltages. These three level shifted and filtered signals are fed to the microcontroller 124 for analysis. The microcontroller 124 receives the conditioned input signals and performs conversions and calculations on these input signals. The voltages are converted to numeric values using an analog to digital converter in the microcontroller 124 processing by a Root-Mean-Square (RMS) algorithm simultaneously with phase and frequency measurement and instantaneous value comparison. The RMS value and input power source frequency are computed over a number of input power source periods and stores the results for a sampling period. The phase measurement is performed that compares lines L1A and L2A to NA or L1B and L2B to NB and stored for the sampling period in internal memory. The instantaneous data converted by the analog to digital converter is numerically filtered and compared to predetermined thresholds for fast decision control. The isolated data output stage 126 is coupled to the microprocessor 124 to feed two output signals and one input signal between the microcontroller 124 and the power control stage 18 through the detectors interface 92. The operation of detectors 22 and 26 using the microcontroller 124 provides packets of data to be fed to the control processor stage 74 each sampling period along with a high speed signal FA that interrupts the control processor stage 74 upon the requirement to react for fast decision control. The packets of data periodically sent to the control processor stage 74 contain numeric values of line L1A or L1B RMS voltage, line L2A or L2B RMS voltage, earth ground RMS voltage, source frequency and parametric data of phase and status flags of predetermined threshold comparisons. These packets of data are sent when the control processor stage 74 initiates the transmission with a series of synchronous clock pulses. The high-speed signal FA can interrupt the control processor stage 74 at any time and is used to signal the control processor stage 74 to immediately open the switching power relays 20 or 24 due to a hazardous condition such as open neutral, open ground, or extremely low or high voltage.

Figure 5:
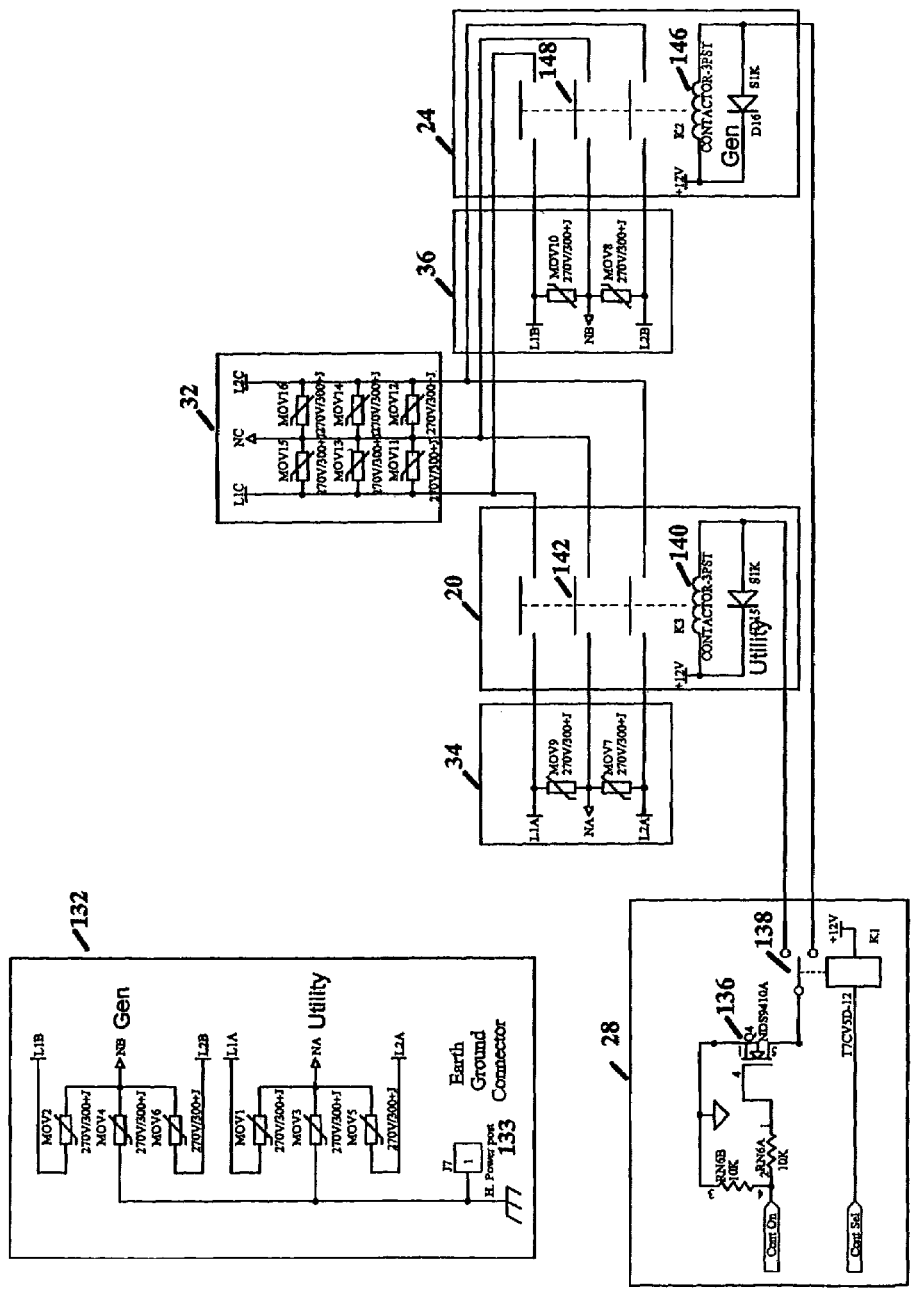

As shown in FIG. 5, the utility switching power relay 20 is coupled to the utility power source 14 by surge protector 34, the generator switching power relay 24 is coupled to the generator power source 16 by surge protector 36, and ground is connected to the coach 11 by the surge protector 32 and the selector switch 28. Specifically, the utility switching power relay 20 comprises a contactor with protected DC coil 140 and contacts 142 with inputs coupled to surge suppressor metal oxide varistors (MOV) 34 and utility power source 14 lines L1A, L2A and NA. Similarly, the generator switching power relay 24 comprises a contactor with protected DC coil 146 and contacts 148 with inputs coupled to surge suppressor MOVs 36 and the generator power source 16 of lines L1B, L2B and NB. DC coils 140 and 146 are used to prevent audible hum and to eliminate chatter. The outputs contactor contacts of 142 and 148 are coupled together and to the coach. The fail safe interlock selector or switch 28 comprises a transistor switch 136 coupled through a selector relay 138 to provide fault tolerant operation preventing both switching power relays 20 and 24 from being activated simultaneously. The surge suppressor 32 comprises MOVs coupled to the coach connection across lines L1C and L2C to NC to provide protection for high voltage transient produced within the coach 11. The surge suppressors 34 and 36 are coupled to the utility 14 and generator 16 connections across the lines L1A and L2A to NA and the lines L1B and L2B to NB respectively to provide high voltage transient protection for the respective power sources. The surge suppressor 132 including the utility surge protector 34 and the generator surge protector 36 (FIG. 1) comprises circuit board mounted MOVs that protects the system from surges in lines L1A and L2A and NA (utility surge protector 34) and lines L1B and L2B and NB (generator surge protector 36) to earth ground 133.

Figure 6:
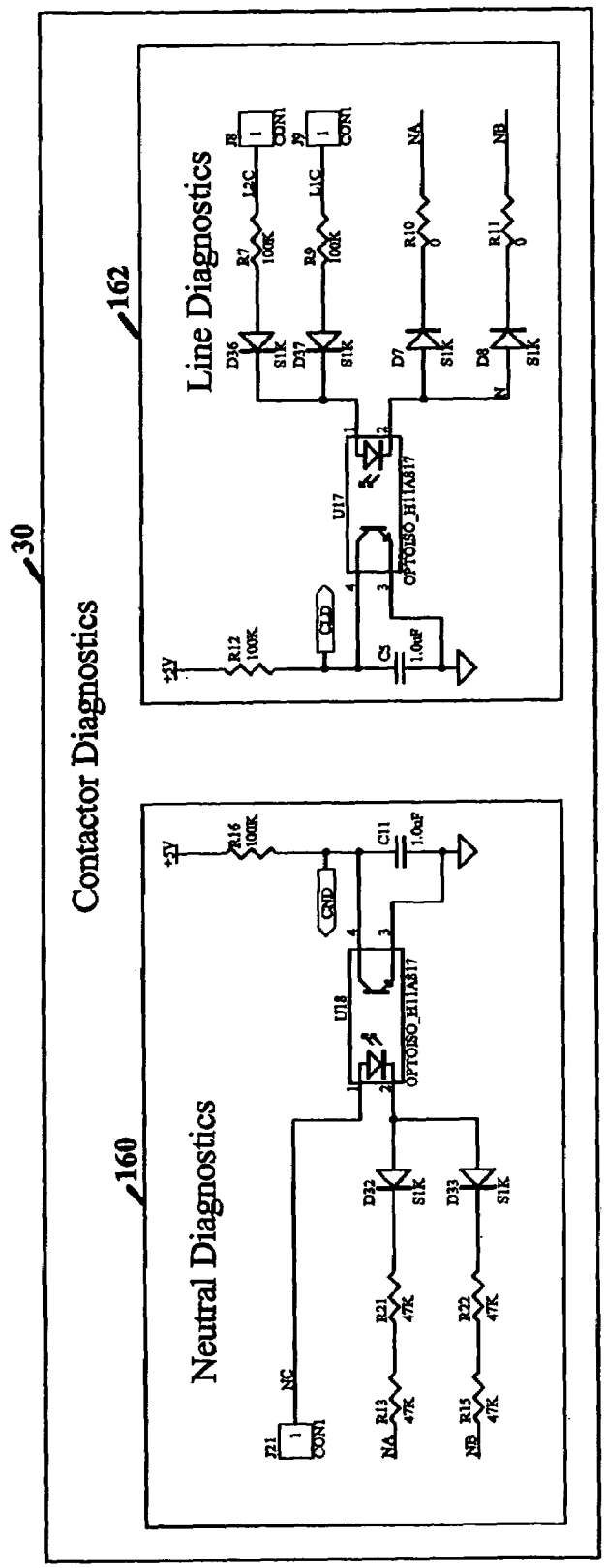

As shown in FIG. 6, the isolated contactor diagnostics 30 comprises a neutral diagnostic stage 160 and a line diagnostic stage 162 both coupled between the switching power relays 20 and 24 and the power control stage 18. The neutral diagnostic stage 160 comprises an optoisolator that is coupled between the neutrals of utility NA and generator NB and coach NC and the power control stage 18 diagnostic line CND. The CND signal is active low when voltage is present on the coach neutral NC with respect to either the source neutrals NA or NB. The presence of an active low signal on CND signals power control stage 18 and a neutral contact indicates a switching power relay malfunction. The power control stage 18 immediately deactivates the switching power relays 20 or 24 and displays a fault code on the system status console 40 and the remote indicator 42. The line diagnostics stage 162 comprises an optoisolator coupled between the neutrals of utility NA and generator NB and coach lines L1C and L2C and the power control stage 18 diagnostic line CLD. The CLD signal is active low when voltage is present on the coach lines L1C or L2C with respect to either the source neutrals NA or NB. The presence of an active low signal on line CLD signals the power control stage 18 that voltage is present on the coach 11. The power control stage 18 checks the CLD signal before either switching power relay 20 or 24 is activated to analyze for malfunctioning, welded or stuck contacts and checks after either switching power relay 20 or 24 is activated to analyze for malfunctioning open contacts and if either fault condition occurs, the power control stage 18 deactivates or opens the activated or operating switching power relay 20 or 24 and displays a fault code on the system status console 40 and the remote indicator 42. In other words, anytime a faulty contactor 20 or 24 is diagnosed, the control processor stage 74 of power control stage 18 prevents any further activation of the activated or operating switching power relay 20 and 24. Further, the CLD signal is used by control stage 18 for timing the power source transfer of utility 14 to generator 16 or generator 16 to utility 14 dynamically based on the power relay dropout time. This provides as fast as possible transfer switching to minimize the effects of lost power during the transfer such as digital docks losing time or AC re-setting.

Figure 7:
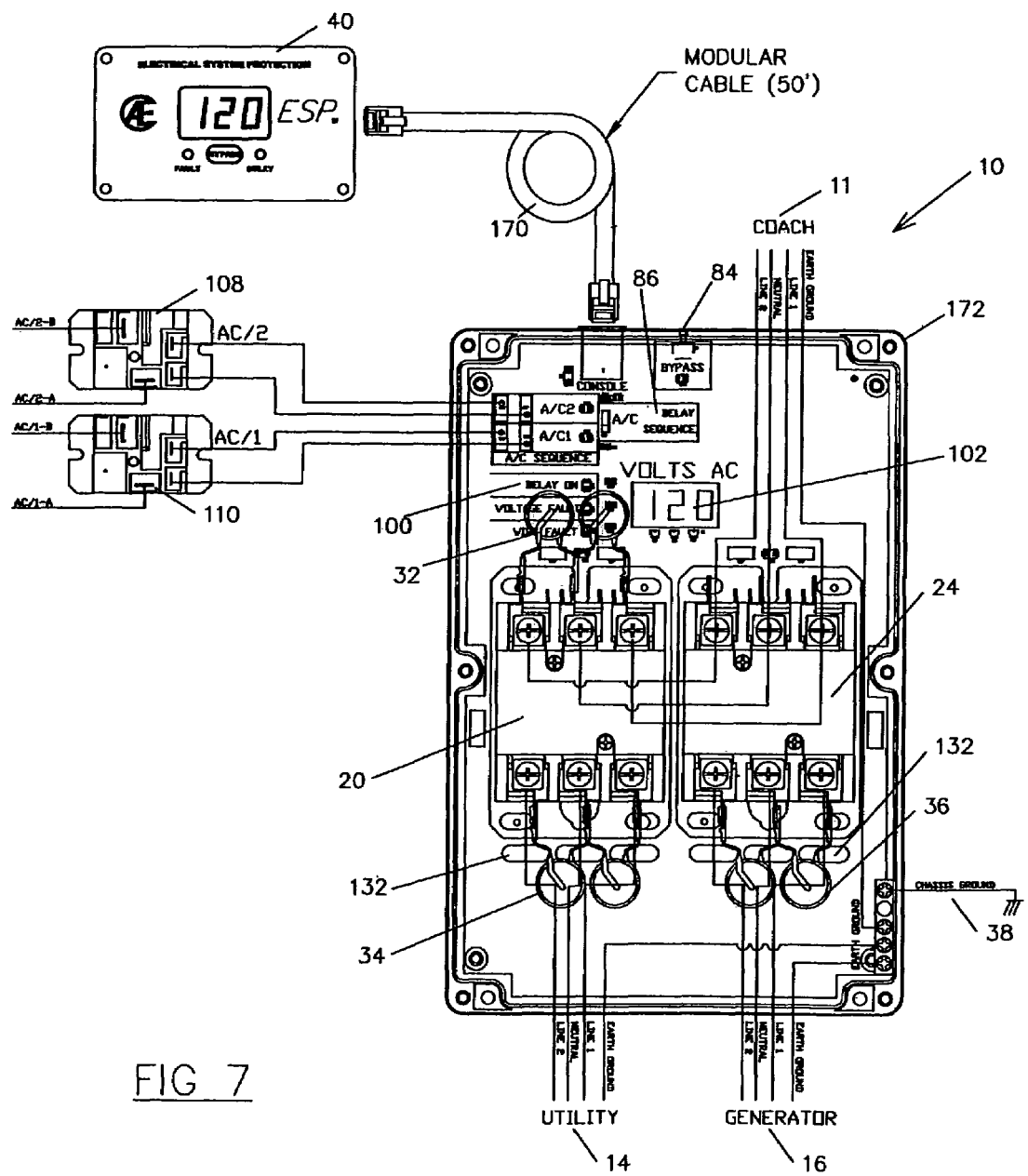

FIG. 7 shows a front view for the electrical power control system 10 and the hookup detail. The housing 172 further contains circuitry with the inputs for power sources 14 and 16 as well as the outputs to the coach 11, the load management relays 108 and 110 and the chassis ground connection 38 and the remote console 40 connected with modular cable 170. The remote console 40 contains segmented displays as well as indicator lamps for system monitoring and a by-pass input switch to control the operation of the electrical control system 10.

It will thus been seen that objects set forth above, among those made apparent from the proceeding description are efficiently obtained since certain changes may be made in the above construction without departing from the scope of the invention, it is intended that all matter contained in the above description are shown in the accompanying drawings shall be interpreted as illustrative and not in a limiting sense.

It is also to be understood that the following claims are intended to cover all of the generic and specific features of the invention herein described, in all statements of the scope of the invention which, is a matter of language might be said to fall there between.

Now that the invention has been described:

What is claimed is:

1. An electrical power control system for use with a recreational vehicle or similar load to selectively control power thereto from either a utility power source or a generator power source comprising a power control stage coupled to the utility power source and the generator power source by a power supply stage wherein said power supply stage includes a low-voltage direct current power supply to operate the electrical power control stage and a utility/generator switch arrangement to selectively direct the power from either the utility power source or the generator power source to the recreational vehicle and wherein said power control stage includes a control processor section to monitor polarity, phase and voltage levels, and a load management section to control the operation of the electrical power control system to control the utility/generator switch arrangement to selectively feed power from either the utility power source or the generator power source to the recreational vehicle under a predetermined plurality of operating parameters or conditions and fault conditions, said switch arrangement comprises a first power control switch selectively operable in a first state or a second state coupled between the first power source and the operating load to feed power from the first power source to the operating load when said first power control switch is in said first state and a second power control switch selectively operable in a first state or a second state coupled between the second power source and the operating load to feed power from the second power source to the operating load when said second power control switch is in said first state, further including a power control switch selector selectively operable in a first state and a second state coupled between said first power control switch and said power control stage and between said second power control switch and said power control stage such that power is fed from the first power source to the operating load when said first power control switch is in said first state and said power control switch selector is in said first state and power is fed from the second power source to the operating load when said second power control switch is in said first state and said power control switch selector is in said second state, said power control stage generates a control signal to activate the other of said first power control switch or said second power control switch to said first state to supply power to the operating load from the corresponding power source when a malfunction signal is received from said first power control switch or said second power control switch to be deactivated.

2. The electrical power control system of claim 1 wherein said power supply stage further includes a power control switch monitoring device coupled to the first power source and the second power source, said isolated low-voltage direct current power supply, said first power control switch and said second power control switch and said power control stage, said power control switch monitoring device including circuitry to generate a malfunction signal when said first power control switch or said second power control switch is in a fault condition and to feed said malfunction signal to said power control stage, said power control stage including circuitry to deactivate said first power control switch or said second power control switch when a malfunction signal is received from said first power control switch or said second power control switch respectively.

3. The electrical power control system of claim 1 wherein said switch arrangement includes an interlock switch coupled between said first power control switch and said second power control switch and said control processor section to prevent said first power control switch and said second power control switch from being in said first state when both the first power source and second power source are actively coupled to said electrical power control system.

4. The electrical power control system of claim 1 wherein the voltage level fault conditions are detected for a predetermined period of time before a fault signal is generated to prevent temporary line fluctuations from activating a fault condition.

5. An electrical power control system for use with a recreational vehicle or similar load to selectively control power thereto from either a utility power source or a generator power source comprising a power control stage coupled to the utility power source and the generator power source by a power supply stage wherein said power supply stage includes a low-voltage direct current power supply to operate the electrical power control stage and a utility/generator switch arrangement to selectively direct the power from either the utility power source or the generator power source to the recreational vehicle and wherein said power control stage includes a control processor section to monitor polarity, phase and voltage levels, and a load management section to control the operation of the electrical power control system to control the utility/generator switch arrangement to selectively feed power from either the utility power source or the generator power source to the recreational vehicle under a predetermined plurality of operating parameters or conditions and fault conditions, wherein said power control stage generates a control signal to activate the other of said first power control switch or said second power control switch to said first state to supply power to the operating load from the corresponding power source when a malfunction signal is received from said first power control switch or said second power control switch to be deactivated.

6. An electrical power control system for use with an operating load to selectively control the flow of power thereto from a first power source or a second power source comprising a power control stage coupled to the first power source and the second power source by a power supply stage including an isolated low-voltage direct current power supply to supply power to said power control stage and a switch arrangement to selectively control the flow of power from the first power source or the second source to the operating load wherein said power control stage includes a control processor section including circuitry to receive signals from said power supply stage representing the voltage polarity and voltage levels of the first power source and the second power source and conductor line fault condition between the first power source and said switch arrangement and between the second power source and said switch arrangement and a load management section including circuitry to generate a control signal when the voltage polarity and voltage levels from the first power source or the second power source are within a predetermined range and there is no fault in the conductor lines to control said switch arrangement to selectively supply power from the first power source or the second power source to the operating load wherein said power control stage further includes a by-pass mode to generate a by-pass control signal to selectively change the state of said first power control switch or said second power control switch from said second state to said first state when the voltage level of the active power source is within a second predetermined range.

7. The electrical power control system of claim 6 wherein said power supply stage further includes a first power source detector coupled between the first power source and said power control stage to generate said voltage polarity and voltage level signals of the first power source and the conductor line fault condition signal of said first power control switch and the first power source, and a second power source detector coupled between the second power source and said power control stage to generate said voltage polarity and voltage level signals of the second power source and the conductor line fault condition signal of said second power control switch and the second power source.

8. The electrical power control system of claim 6 wherein said power control stage delays power to said first power control switch or said second power control switch for a predetermined period after power is initially fed from said isolated low-voltage direct current power supply to said power control stage to delay the change of state from said second state to said first state of said first power control switch or said second power control switch to delay power from the first power source through said first power control switch to the operating load or the second power source through said second power control switch to the operating load for said predetermined period of time.

9. The electrical power control system of claim 6 further including surge protection coupled between the first power source and said power supply stage, and the second power source and said power supply stage to protect said electrical power control system from power surges.

10. An electrical power control system for use with an operating load to selectively control the flow of power thereto from a first power source or a second power source comprising a power control stage coupled to the first power source and the second power source by a power supply stage including an isolated low-voltage direct current power supply to supply power to said power control stage and a switch arrangement to selectively control the flow of power from the first power source or the second source to the operating load wherein said power control stage includes a control processor section including circuitry to receive signals from said power supply stage representing the voltage polarity and voltage levels of the first power source and the second power source and conductor line fault condition between the first power source and said switch arrangement and between the second power source and said switch arrangement and a load management section including circuitry to generate a control signal when the voltage polarity and voltage levels from the first power source or the second power source are within a predetermined range and there is no fault in the conductor lines to control said switch arrangement to selectively supply power from the first power source or the second power source to the operating load and further comprising a by-pass mode such that the operating load is operable when the voltage levels from the active power source are out of a predetermined operating range or limit and within a second predetermined minimum and maximum voltage range.

11. The electrical power control system of claim 10 further including surge protection coupled between said power control stage and the operating load to protect the operating load from power surges.

12. An electrical power control system for use with an operating load to selectively control the flow of power thereto from a power source comprising a power control stage coupled to the power source by a power supply stage including an isolated low-voltage direct current power supply to supply power to said power control stage and a switch arrangement to selectively control the flow of power from the power source to the operating load wherein said power control stage includes a control processor section including circuitry to receive signals from said power supply stage representing the voltage polarity and voltage levels of the power source, and conductor line fault condition between the power source and said switch arrangement and a load management section including circuitry to generate a control signal when the voltage polarity and voltage level from the power source are within a predetermined range and there is no fault in the conductor lines to control said switch arrangement to selectively supply power from the power source to the operating load, wherein said power control stage further includes a by-pass mode to generate a by-pass control signal to selectively change the state of said power control switch from said second state to said first state when the voltage level of the power source is within a second predetermined range.

13. The electrical power control system of claim 12 wherein said switch arrangement comprises a power control switch selectively operable in a first state or a second state coupled between the power source and the operating load to feed power from the power source to the operating load when said power control switch is in said first state.

14. The electrical power control system of claim 13 wherein said power supply stage further includes a power control switch monitoring device coupled to first power source, said isolated low-voltage direct current power supply, said power control switch and said power control stage, said power control switch monitoring device including circuitry to generate a malfunction signal when said power control switch is in a fault condition and to feed said malfunction signal to said power control stage, said power control stage including circuitry to deactivate said power control switch when a malfunction signal is received from said power control switch monitoring device.

15. The electrical power control system of claim 13 wherein said power control stage delays power to said first power control switch for a predetermined period after power is initially fed from said isolated low-voltage direct current power supply to said power control stage to delay the change of state from said second state to said first state of said power control switch to delay power from the power source through said power control switch to the operating load for said predetermined period of time.

16. The electrical power control system of claim 12 wherein said power supply stage further includes a power source detector coupled between the power source and said power control stage to generate said voltage polarity and voltage level signals of the power source and the conductor line fault condition signal of said first power control switch and the power source.

17. The electrical power control system of claim 16 wherein the voltage level fault conditions are detected for a predetermined period of time before a fault signal is generated to prevent temporary line fluctuations from activating a fault condition.

18. The electrical power control system of claim 12 further including surge protection coupled between the first power source and said power supply stage, and the second power source and said supply power stage to protect said electrical power control system from power surges.

19. An electrical power control system for use with an operating load to selectively control the flow of power thereto from a power source comprising a power control stage coupled to the power source by a power supply stage including an isolated low-voltage direct current power supply to power to said power control stage and a switch arrangement to selectively control the flow of supply from the power source to the operating load wherein said power control stage includes a control processor section including circuitry to receive signals from said power supply stage representing the voltage polarity and voltage levels of the power source, and conductor line fault condition between the power source and said switch arrangement and a load management section including circuitry to generate a control signal when the voltage polarity and voltage level from the power source are within a predetermined range and there is no fault in the conductor lines to control said switch arrangement to selectively supply power from the power source to the operating load, further comprising a by-pass mode such that the operating load is operable when the voltage levels from the power source are out of a predetermined operating range and within a second predetermined minimum and maximum voltage range.

20. The electrical power control system of claim 19 further including surge protection coupled between said power control stage and the operating load to protect the operating load from power surges.

* * * * *